(12) United States Patent
Hirata et al.

(10) Patent No.: US 12,267,733 B2
(45) Date of Patent: *Apr. 1, 2025

(54) COMMUNICATION CONTROL DEVICE, COMMUNICATION CONTROL METHOD, COMMUNICATION TERMINAL, AND COMMUNICATION METHOD FOR SWITCHING A TERMINAL FROM A FIRST CONNECTION TO A SECOND CONNECTION

(71) Applicant: Sony Group Corporation, Tokyo (JP)

(72) Inventors: Ryuichi Hirata, Tokyo (JP); Kosuke Aio, Kanagawa (JP); Shigeru Sugaya, Kanagawa (JP)

(73) Assignee: SONY GROUP CORPORATION, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 18/636,476

(22) Filed: Apr. 16, 2024

(65) Prior Publication Data

US 2024/0259902 A1 Aug. 1, 2024

Related U.S. Application Data

(63) Continuation of application No. 17/430,324, filed as application No. PCT/JP2020/009656 on Mar. 6, 2020, now Pat. No. 11,968,579.

(30) Foreign Application Priority Data

Mar. 22, 2019 (JP) ................................. 2019-054045

(51) Int. Cl.
*H04W 36/00* (2009.01)
*H04W 36/08* (2009.01)

(52) U.S. Cl.
CPC ... *H04W 36/0016* (2013.01); *H04W 36/0055* (2013.01); *H04W 36/08* (2013.01)

(58) Field of Classification Search
CPC ......... H04W 36/0055; H04W 36/0038; H04W 72/23

See application file for complete search history.

(56) References Cited

U.S. PATENT DOCUMENTS 7,818,449 B2 10/2010 Stahl et al.
8,233,454 B2 7/2012 Ikeda
(Continued)

FOREIGN PATENT DOCUMENTS

CN 1481651 A 3/2004
CN 101461264 A * 6/2009 ............ H04W 8/005
(Continued)

OTHER PUBLICATIONS

English translation of JP2008034906A Oct. 2023. (Year: 2023).*

(Continued)

*Primary Examiner* — William D Cumming
(74) *Attorney, Agent, or Firm* — XSENSUS LLP

(57) ABSTRACT

A communication control device that causes a second communication device to generate a switching response frame indicating a response of connection switching that is to be transmitted to a communication terminal configured to switch a connection destination from a first communication device to the second communication device, on the basis of information regarding a connection between the first communication device and the communication terminal.

7 Claims, 17 Drawing Sheets

(56) References Cited

U.S. PATENT DOCUMENTS

| | | | |
|---|---|---|---|
| 8,832,820 B2 | 9/2014 | Barjatiya et al. | |
| 9,426,066 B2 | 8/2016 | Shiraki | |
| 10,080,183 B2 | 9/2018 | Miyata | |
| 10,660,125 B2 * | 5/2020 | Irie | H04L 5/0091 |
| 11,968,579 B2 * | 4/2024 | Hirata | H04W 36/0038 |
| 2009/0141685 A1 | 6/2009 | Berglund | |
| 2009/0232096 A1 | 9/2009 | Taniuchi | |
| 2011/0092213 A1 | 4/2011 | Forsberg et al. | |
| 2012/0321309 A1 | 12/2012 | Barry et al. | |
| 2014/0064284 A1 | 3/2014 | Shiraki | |
| 2014/0133394 A1 | 5/2014 | Abraham et al. | |
| 2014/0355564 A1 | 12/2014 | Cherian et al. | |
| 2016/0007278 A1 | 1/2016 | Gupta et al. | |
| 2016/0302144 A1 | 10/2016 | Kasslin et al. | |
| 2017/0134996 A1 | 5/2017 | Wang et al. | |
| 2017/0265112 A1 | 9/2017 | Morita et al. | |
| 2018/0183662 A1 | 6/2018 | Likar | |
| 2018/0255571 A1 * | 9/2018 | Irie | H04W 72/23 |
| 2019/0297553 A1 | 9/2019 | Wang et al. | |
| 2022/0095190 A1 | 3/2022 | Aio | |
| 2022/0132382 A1 * | 4/2022 | Hirata | H04W 36/0038 |
| 2024/0259902 A1 * | 8/2024 | Hirata | H04W 36/0055 |

FOREIGN PATENT DOCUMENTS

| | | | | |
|---|---|---|---|---|
| CN | 101461264 B * | 12/2010 | | H04W 8/005 |
| CN | 104703235 A | 6/2015 | | |
| CN | 105072650 A | 11/2015 | | |
| CN | 105744579 A | 7/2016 | | |
| CN | 106688271 A | 5/2017 | | |
| CN | 107181508 A | 9/2017 | | |
| CN | 108235384 A | 6/2018 | | |
| CN | 113574932 A * | 10/2021 | | H04W 36/0016 |
| EP | 1232662 A1 | 8/2002 | | |
| EP | 2034751 B1 * | 8/2017 | | H04W 8/005 |
| EP | 3373631 A1 * | 9/2018 | | H04B 7/0695 |
| EP | 3373631 B1 * | 3/2021 | | H04B 7/0695 |
| EP | 3944669 A1 * | 1/2022 | | H04W 36/0016 |
| JP | 2006-222549 A | 8/2006 | | |
| JP | 2006-295820 A | 10/2006 | | |
| JP | 2008-034906 A | 2/2008 | | |
| JP | 4971319 B2 * | 7/2012 | | H04W 8/005 |
| JP | 2015-046849 A | 3/2015 | | |
| JP | 6165318 B2 * | 7/2017 | | H04W 4/80 |
| JP | 6785453 B2 * | 11/2020 | | H04B 7/0695 |
| JP | 7456432 B2 * | 3/2024 | | H04W 36/0016 |
| KR | 2008-0114469 A | 12/2008 | | |
| WO | WO-2016009481 A1 * | 1/2016 | | H04W 4/80 |
| WO | WO-2017077686 A1 * | 5/2017 | | H04B 7/0695 |
| WO | 2018/217901 A1 | 11/2018 | | |
| WO | WO-2020195704 A1 * | 10/2020 | | H04W 36/0016 |

OTHER PUBLICATIONS

International Search Report and Written Opinion mailed on Jun. 2, 2020, received for PCT Application PCT/JP2020/009656, filed on Mar. 6, 2020, 10 pages including English Translation.
Asterjadhi et al., "Wireless LANs", Qualcomm Inc., doc.:IEEE 802.11-18/0041r1, Jan. 5, 2018, pp. 1-4.
Perahia et al., "Client Management", HPE-Aruba, doc.:IEEE 802.11-17/0620r0, Apr. 25, 2017, 8 pages.
"IEEE Recommended Practice for Network Reference Model and Functional Description of IEEE 802(R) Access Network," in IEEE Std 802.1CF-2019, vol. No., pp. 1-185, May 31, 2019, doi: 10.1109/IEEESTD.2019.8726453. (Year: 2019).

* cited by examiner

FIG. 6

| Category | WNM Action | Dialog Token | BSS Transition Query Reason | BSS Transition Candidate List Entries (Optional) |
|---|---|---|---|---|
| 1 | 1 | 1 | 1 | variable |

Octets:

FIG. 7

| Category | WNM Action | Dialog Token | Request mode | Disassociation Timer |
|---|---|---|---|---|
Octets: 1 | 1 | 1 | 1 | 2

| Validity Interval | BSS Termination Duration (optional) | Session Information URL (optional) | BSS Transition Candidate List Entries (Optional) |
|---|---|---|---|
Octets: 1 | 0 or 12 | variable | variable

FIG. 8

| Category | WNM Action | Dialog Token | BTM Status Code | BSS Termination Delay | Target BSSID (Optional) | BSS Transition Candidate List Entries (Optional) |
|---|---|---|---|---|---|---|
| 1 | 1 | 1 | 1 | 1 | 0 or 6 | variable |

Octets:

FIG. 10

| Category | WNM Action | Dialog Token | BSS Transition Query Reason | BSS Transition Candidate List Entries | Connection Information |
|---|---|---|---|---|---|
| 1 | 1 | 1 | 1 | variable | variable |

Octets:

FIG. 11

| Category | WNM Action | Dialog Token | Request mode | Disassociation Timer | Validity Interval | BSS Termination Duration | Session Information URL | BSS Transition Candidate List Entries | Connection Information |
|---|---|---|---|---|---|---|---|---|---|
| Octets: 1 | 1 | 1 | 1 | 2 | 1 | 0 or 12 | variable | variable | variable |

COMMUNICATION CONTROL DEVICE, COMMUNICATION CONTROL METHOD, COMMUNICATION TERMINAL, AND COMMUNICATION METHOD FOR SWITCHING A TERMINAL FROM A FIRST CONNECTION TO A SECOND CONNECTION

CROSS-REFERENCE TO RELATED APPLICATIONS

The present application is a continuation of U.S. application Ser. No. 17/430,324, filed Aug. 12, 2021, which is based on PCT filing PCT/JP2020/009656, filed Mar. 6, 2020, which claims priority to JP 2019-054045, filed Mar. 22, 2019, the entire contents of each are incorporated herein by reference.

TECHNICAL FIELD

The present technology relates to a communication control device, a communication control method, a communication terminal, and a communication method, and relates particularly to a communication control device, a communication control method, a communication terminal, and a communication method that enable an access point serving as a connection destination, to be smoothly switched.

BACKGROUND ART

In recent years, a plurality of access points (hereinafter, will be referred to as APs) has been installed even in homes. A wireless communication terminal (hereinafter, will be referred to an STA) such as a smartphone can possibly vary in communication quality in accordance with a distance from an AP due to a movement or the like. Thus, in the STA, it is desirable to swiftly switch a connection destination in such a manner that the STA can connect to an AP most appropriate for itself.

In BSS Transition Management defined by IEEE 802.11k, for an STA switching a connection destination AP, it is necessary to exchange a plurality of frames for establishing connection between the STA and the connection destination AP, and a section in which data communication cannot be performed is generated.

In view of the foregoing, Patent Document 1 proposes a technology that does not perform new device authentication and connection establishment when a terminal switches a connection destination AP by sharing information necessary for establishment of connection with the terminal, with a base station.

CITATION LIST

Patent Document

Patent Document 1: Japanese Patent Application Laid-Open No. 2015-46849

SUMMARY OF THE INVENTION

Problems to be Solved by the Invention

In the technology of Patent Document 1, the terminal is not notified that a connection destination AP has been switched. Thus, the terminal cannot recognize that the connection destination AP has been switched, and there is concern that the terminal transmits data to an original connection destination AP, or fail to receive data transmitted from a new connection destination AP.

Thus, the switching of a connection destination is limited to switching in such an environment that an address of a switching source AP and an address of a switching destination AP are the same, for example.

The present technology has been devised in view of such situations, and enables an access point serving as a connection destination, to be smoothly switched.

Solutions to Problems

A communication control device according to an aspect of the present technology includes a control unit configured to cause a second communication device to generate a switching response frame indicating a response of connection switching that is to be transmitted to a communication terminal configured to switch a connection destination from a first communication device to the second communication device, on the basis of information regarding connection between the first communication device and the communication terminal.

A communication terminal according to another aspect of the present technology includes a receiving unit configured to receive a transmitted switching response frame indicating a response of connection switching that is generated by a second communication device on the basis of information regarding connection with a first communication device, and a control unit configured to switch a connection destination from the first communication device to the second communication device in a case where the switching response frame is decoded.

In an aspect of the present technology, a switching response frame indicating a response of connection switching that is to be transmitted to a communication terminal configured to switch a connection destination from a first communication device to a second communication device is generated by the second communication device on the basis of information regarding connection between the first communication device and the communication terminal.

In another aspect of the present technology, a transmitted switching response frame indicating a response of connection switching that is generated by a second communication device on the basis of information regarding connection with a first communication device is received. In a case where the switching response frame is decoded, a connection destination is switched from the first communication device to the second communication device.

BRIEF DESCRIPTION OF DRAWINGS

FIG. 6 is a diagram illustrating a configuration example of a frame format of a BSS transition query frame.

FIG. 7 is a diagram illustrating a configuration example of a frame format of a BSS transition request frame.

FIG. 8 is a diagram illustrating a configuration example of a frame format of a BSS transition response frame.

FIG. 10 is a diagram illustrating a configuration example of a frame format of a switching query frame.

FIG. 11 is a diagram illustrating a configuration example of a frame format of a switching request frame.

MODE FOR CARRYING OUT THE INVENTION

Hereinafter, a mode for carrying out the present technology will be described. The description will be given in the following order.

0. Configuration Examples of System and Devices
1. First Embodiment (Example of Start by STA)
2. Second Embodiment (Example of Start by AP)
3. Third Embodiment (Example of Start by Controller)
4. Fourth Embodiment (Computer)

0. Configuration Examples of System and Devices

<Configuration Example of Communication System>

Figure 1:
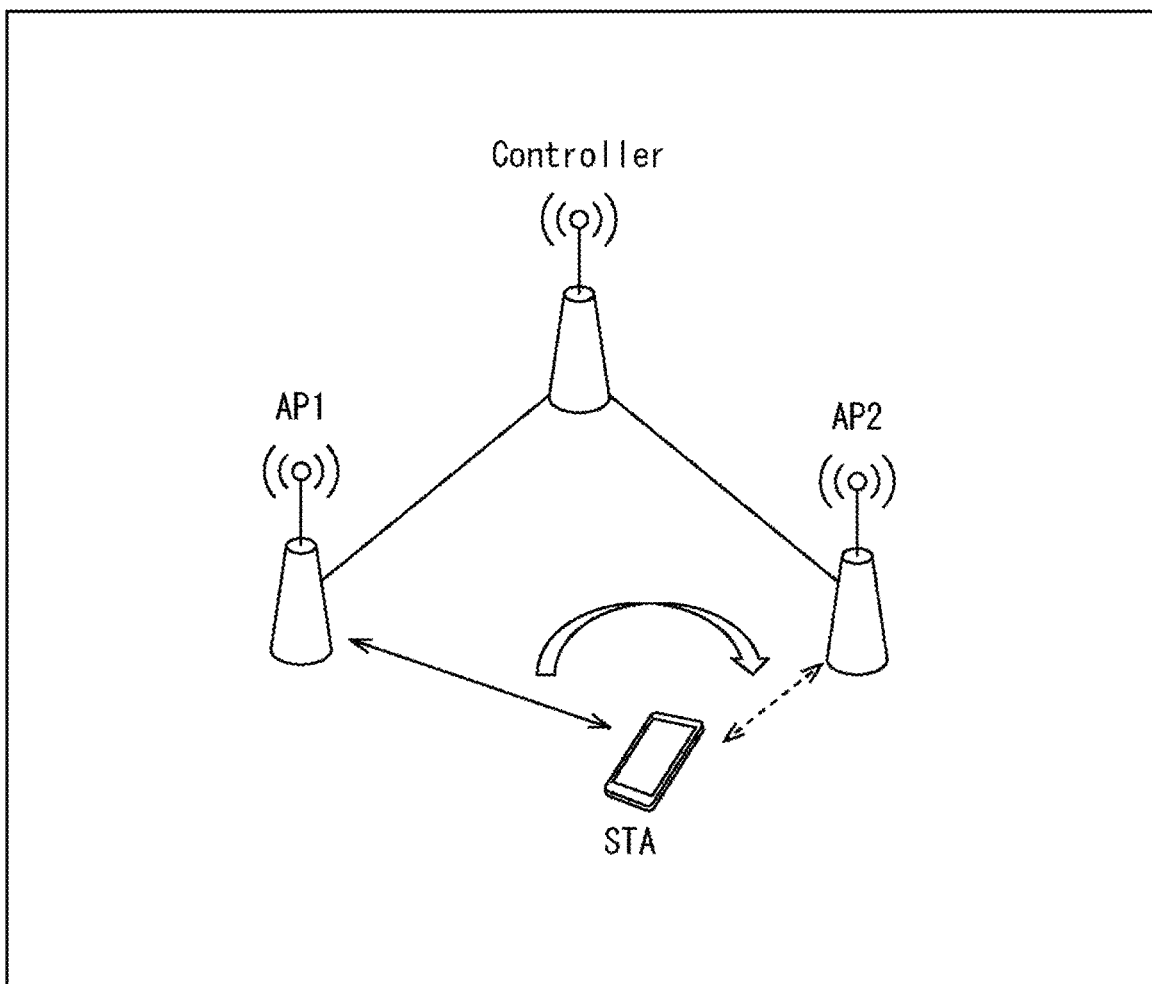
FIG. 1 is a diagram illustrating a configuration example of a communication system of the present technology.

FIG. 1 is a diagram illustrating a configuration example of a communication system according to an embodiment of the present technology.

The communication system illustrated in FIG. 1 has a configuration in which an access point (hereinafter, will be referred to as an AP) 1 and an AP 2, and a controller are connected by wired communication or wireless communication. Furthermore, the communication system has a configuration in which the AP 1 and the AP 2, and an STA being a communication terminal are connected by wireless communication.

The AP 1 and the AP 2 are communication devices that control networks in the respective accessible ranges of radio waves. The controller is a communication control device that controls communication of a plurality of APs. The STA is a communication device that operates as a communication terminal belonging to a network managed by an AP, and serves as a client. The STA has a configuration portable by a user, for example. A Basic Service Set (BSS) includes an AP and an STA.

Note that, in FIG. 1, the controller is formed as a single body as a communication control device, but because the controller is defined as an entity, the controller may be formed as one function of a communication device functioning as either AP. Furthermore, the communication control device may perform both of execution of an operation of a controller and execution of an operation of an AP.

Hereinafter, the description will be given of an example in which the AP 1 and the STA are connected and perform communication, and the STA that has moved in accordance with the movement of a user switches a connection destination from the AP 1 to the AP 2. The AP 1 is a switching source AP and the AP 2 is a switching destination AP.

The AP 1 performs communication with the STA as indicated by a solid arrow. In response to a BSS transition query (BSS Transition Management Query) frame transmitted from the STA, the AP 1 transmits a switching query frame for switching a connection destination of the STA, to the controller.

The BSS transition query frame is a frame describing information regarding a query for the STA transitioning from a BSS of the AP 1 to a BSS of the AP 2. The switching query frame includes information regarding connection that has been used for the connection between the AP 1 and the STA, in addition to the information included in the BSS transition query frame. The details of the information regarding connection will be described later.

In response to a switching request frame requesting the switching of a connection destination of the STA that is transmitted from the controller, the AP 2 transmits a switching response frame indicating that a response to switching of a connection destination can be given, to the STA.

The controller receives the switching query frame transmitted from the AP 1. The controller acquires information regarding connection form the switching query frame. By transmitting the switching request frame including the information regarding connection, to the AP 2, the controller causes the AP 2 to generate the switching response frame on the basis of the information regarding connection that is included in the switching request frame.

In a case where communication quality with the AP 1 declines, the STA transmits a BSS transition query frame to the AP 1. The STA receives the switching response frame transmitted from the AP 2. In a case where the switching response frame transmitted from the AP 2 is addressed to itself, and is decodable on the basis of information regarding connection that has been used for the connection between the AP 1 and the STA, the STA switches a connection destination to the AP 2 as indicated by a dotted line arrow.

As described above, the STA can smoothly switch a connection destination AP.

Note that the number of communication devices and a positional relationship therebetween in FIG. 1 are examples, and are not limited to those illustrated in FIG. 1.

<Configuration Example of Communication Device>

Figure 2:
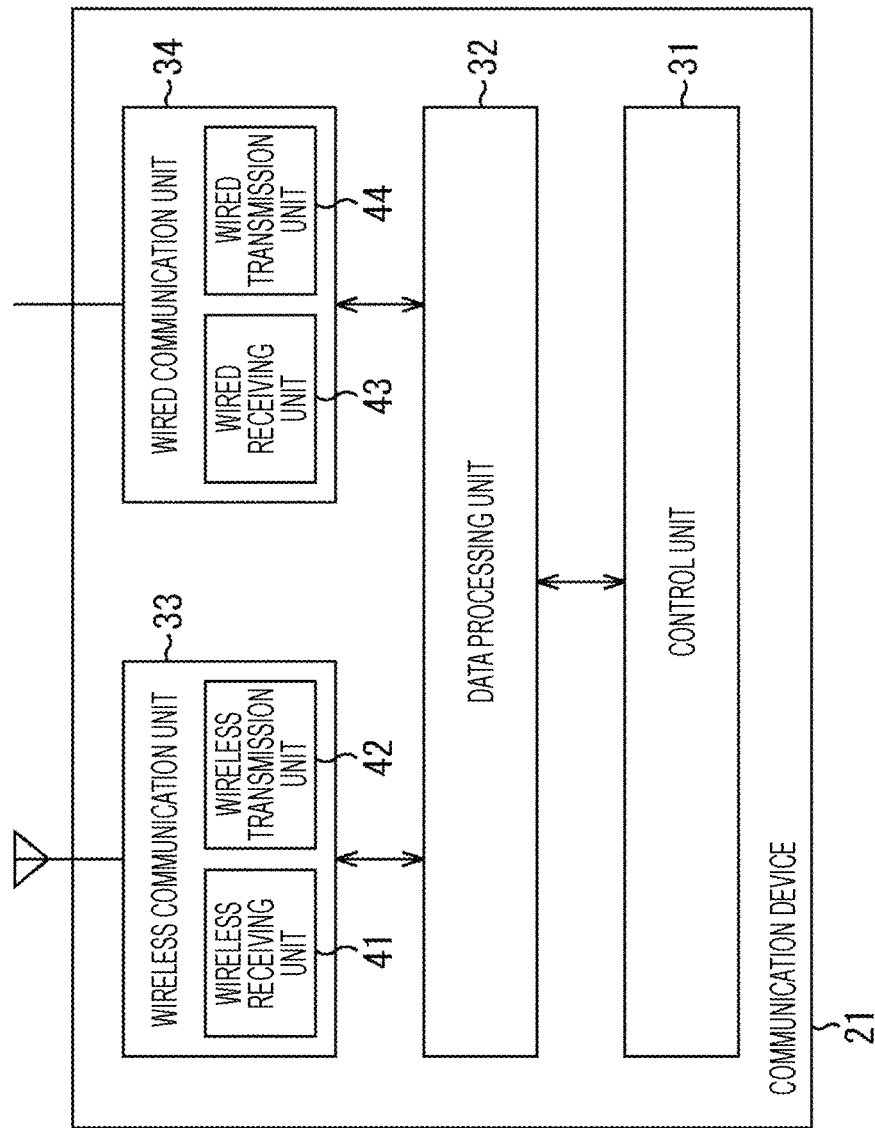
FIG. 2 is a block diagram illustrating a configuration example of a communication device.

FIG. 2 is a block diagram illustrating a configuration example of a communication device.

A communication device 21 illustrated in FIG. 2 is a device operating as an AP.

The communication device 21 includes a control unit 31, a data processing unit 32, a wireless communication unit 33, and a wired communication unit 34.

The control unit 31 includes a central processing unit (CPU), a read only memory (ROM), a random access memory (RAM), and the like. The control unit 31 controls operations of the entire communication device 21 by executing a program stored in the ROM or the like.

The control unit 31 controls each unit to generate a switching query frame including information such as a common key used for connection with the STA, for example.

Furthermore, the control unit 31 controls the data processing unit 32 to generate a packet that enables the STA to perform decoding on the basis of information regarding connection that has been used for connection between another AP and the STA, for example. Control content of which the controller or the STA is to be notified is also determined by the control unit 31.

The data processing unit 32 performs processing of various data signals to be transmitted and received. Specifically, the data processing unit 32 performs processing of generating a data signal to be transmitted with being included in a packet, and processing of extracting a data signal from a decoded received signal. A data signal includes both of communication data to be exchanged between a backhaul line and the STA, and control data including control content determined by the control unit 31.

The wireless communication unit 33 performs communication with an STA existing under a network. Furthermore, the wireless communication unit 33 also performs communication with another AP or a controller included in the network. The wireless communication unit 33 includes a wireless receiving unit 41 and a wireless transmission unit 42.

The wireless receiving unit 41 performs RF processing and digital conversion on a received signal supplied from an antenna, and extracts a data signal including a packet.

The wireless transmission unit 42 performs analog conversion and RF processing on the data signal including the packet that has been generated by the data processing unit 32, generates a transmission signal, and outputs the transmission signal to the antenna.

The antenna releases the transmission signal generated by the wireless transmission unit 42, as electromagnetic waves. Furthermore, electromagnetic waves received by the antenna are output to the wireless receiving unit 41 as a received signal.

The wired communication unit 34 mainly performs communication with the backhaul line, or communication with an AP or a controller included in a network. The wired communication unit 34 includes a wired receiving unit 43 and a wired transmission unit 44.

The wired receiving unit 43 extracts a data signal from a received signal acquired via a wired cable. The wired transmission unit 44 generates a transmission signal to be output to the wired cable, from the data signal generated by the data processing unit 32.

Note that the communication device 21 includes one wireless communication unit 33 and one wired communication unit 34, but may include a plurality of wireless communication units 33 and a plurality of wired communication units 34. For example, in a case where the communication device 21 includes a plurality of wired communication units 34, the plurality of wired communication units 34 can be configured to selectively use the connection with the backhaul line, and connection with the controller. In a case where the communication device 21 includes a plurality of wireless communication units 33, the plurality of wireless communication units 33 can be configured to cover the respective different frequencies (2.4 GHz band/5 GHz band).

<Configuration Example of Communication Control Device>

Figure 3:
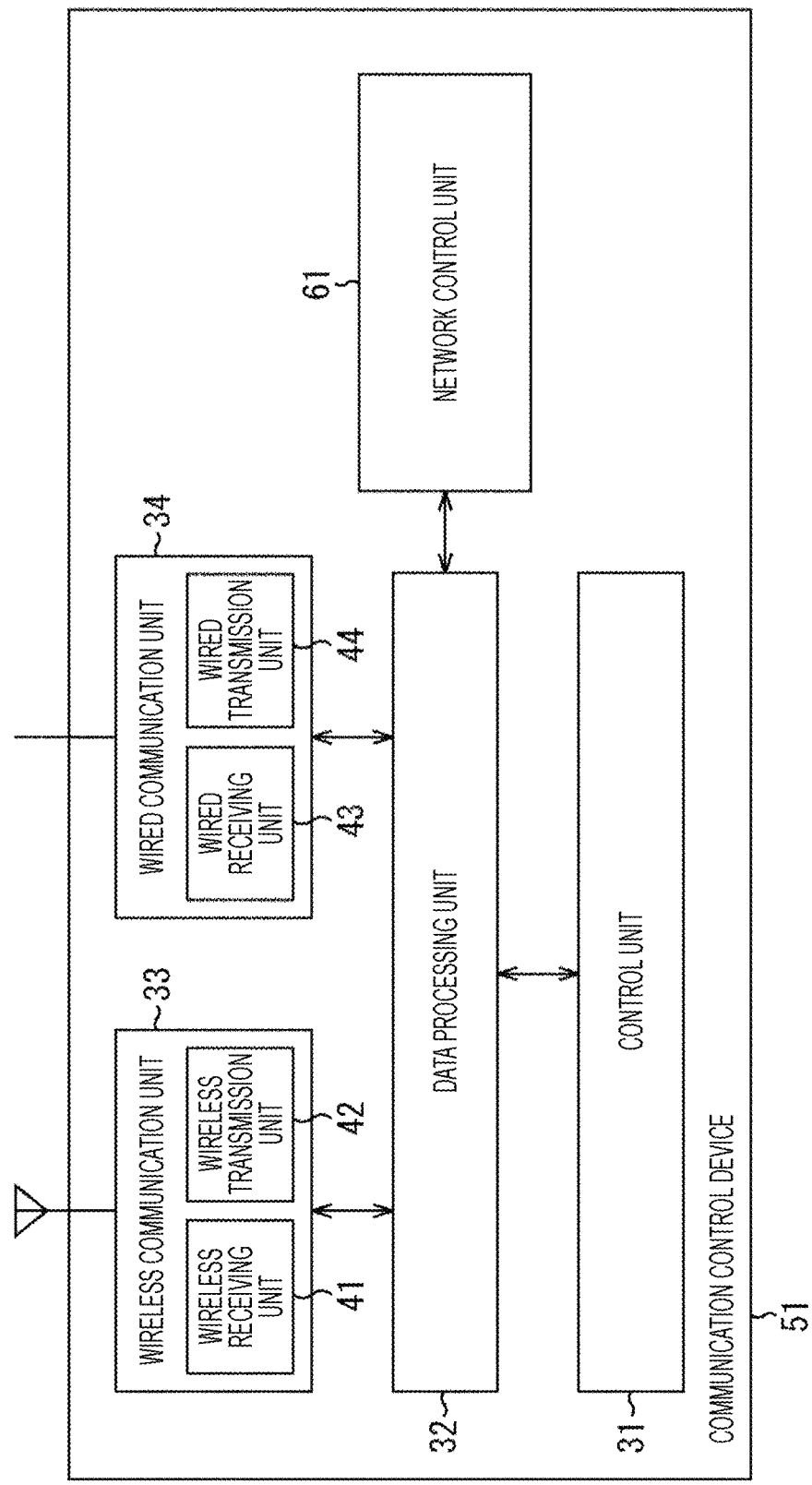
FIG. 3 is a block diagram illustrating a configuration example of a communication control device.

FIG. 3 is a block diagram illustrating a configuration example of a communication control device.

A communication control device 51 illustrated in FIG. 3 is a device operating as a controller.

The communication control device 51 includes the control unit 31, the data processing unit 32, the wireless communication unit 33, the wired communication unit 34, and a network control unit 61. The configuration of the communication control device 51 illustrated in FIG. 3 is different from the configuration of the communication device 21 illustrated in FIG. 2 in that the network control unit 61 is provided.

Among the configurations illustrated in FIG. 3, the same configurations as the configurations described with reference to FIG. 2 are assigned the same reference numerals. The redundant description will be appropriately omitted.

The control unit 31 in FIG. 3 controls each unit to generate a switching request frame including information such as a common key used for connection between an AP and an STA, for example.

The wireless communication unit 33 performs communication with an AP or an STA included in a network.

The wired communication unit 34 mainly performs communication with the backhaul line, or communication with an AP or an STA included in a network.

The network control unit 61 performs information collection from an AP included in the same network, and various types of control. For example, in the network control unit 61, information such as Link information is collected, and frequency control and the like are performed.

Furthermore, when the network control unit 61 receives information regarding connection between an AP and an STA, the network control unit 61 controls the data processing unit 32 to cause a switching destination AP to generate a switching response frame to be transmitted to the STA.

Note that the communication control device 51 is only required to be a device including the network control unit 61, and is only required to include at least one of the wireless communication unit 33 or the wired communication unit 34. Furthermore, in a case where the communication control device 51 includes the wireless communication unit 33, the communication control device 51 can also operate as an AP.

<Configuration Example of Communication Terminal>

Figure 4:
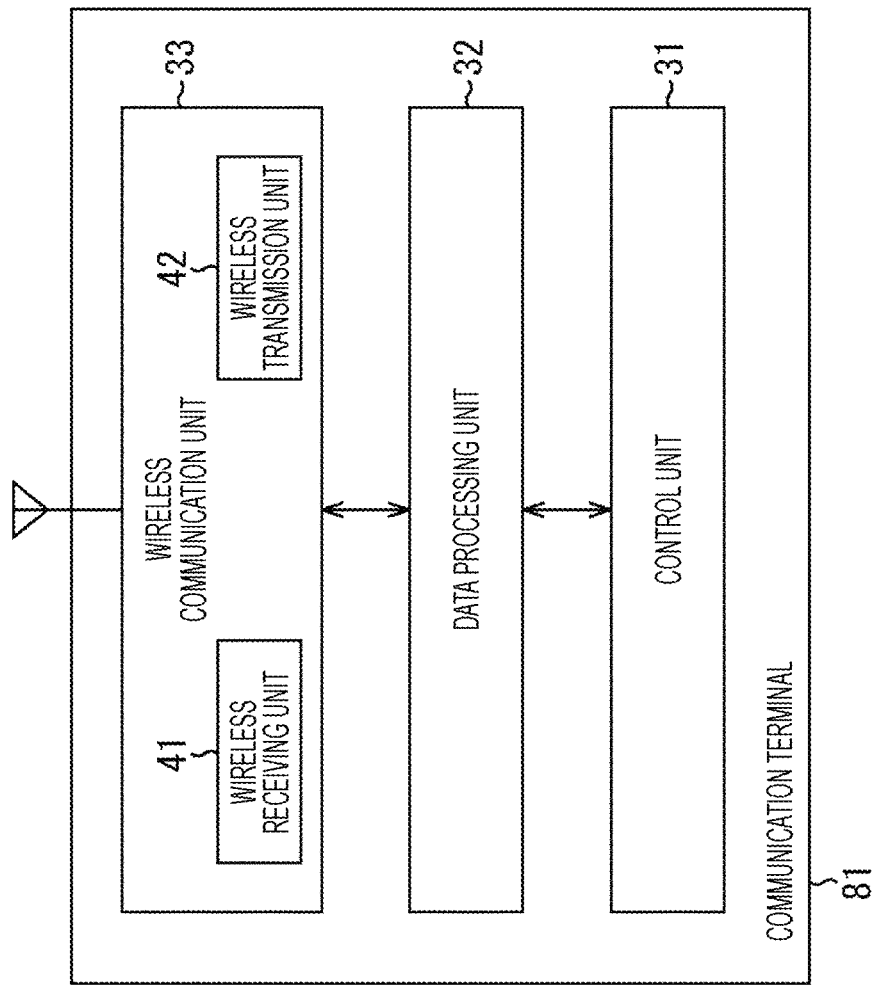
FIG. 4 is a block diagram illustrating a configuration example of a communication terminal.

FIG. 4 is a block diagram illustrating a configuration example of a communication terminal.

A communication terminal 81 illustrated in FIG. 4 is a device operating as an STA.

The communication terminal 81 includes the control unit 31, the data processing unit 32, and the wireless communication unit 33. Among the configurations illustrated in FIG. 4, the same configurations as the configurations described with reference to FIG. 2 are assigned the same reference numerals. The redundant description will be omitted.

The configuration of the communication terminal 81 illustrated in FIG. 4 is different from the configuration of the communication device 21 illustrated in FIG. 2 in that the wired communication unit 34 is excluded.

In a case where communication quality with the AP 1 declines, for example, the control unit 31 in FIG. 4 controls each unit to generate a BSS transition query frame.

Furthermore, the control unit 31 controls the data processing unit 32 to decode the switching response frame by using the same common key as a common key used for connection between the AP and the STA.

The wireless communication unit 33 performs communication with an AP or a controller included in the network.

1. First Embodiment (Example of Start by STA

First of all, an example in which switching of a connection destination is started by the STA will be described as the first embodiment.

<Conventional Switching Example of Connection Destination>

Figure 5:
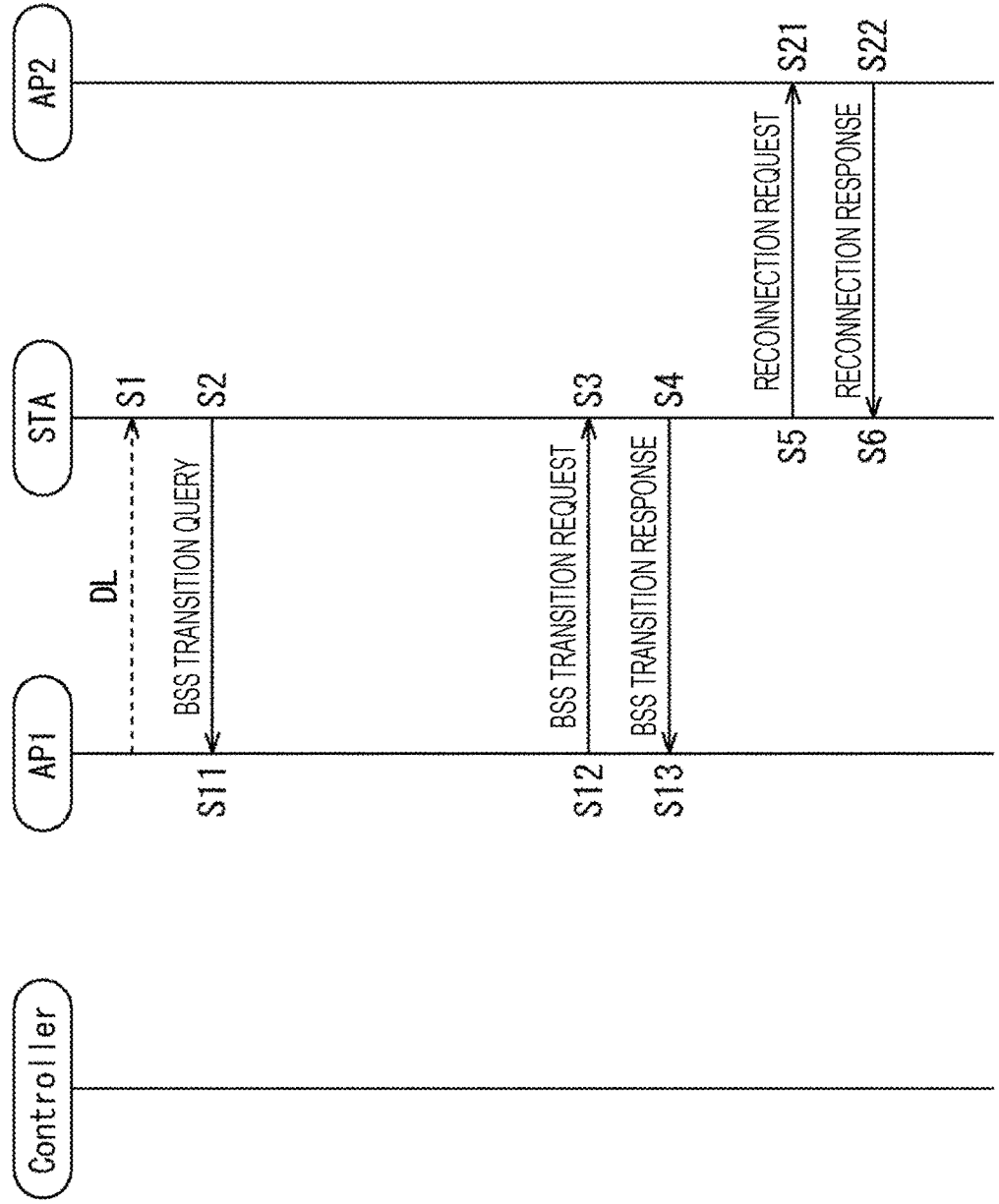
FIG. 5 is a sequence diagram describing a series of conventional operations of switching of a connection destination.

FIG. 5 is a diagram illustrating a sequence describing a series of conventional operations of switching of a connection destination.

The AP 1 and the STA are connected and perform communication. In Step S1, the STA receives a downlink (DL) frame transmitted from the AP 1.

In a case where communication quality between the AP 1 and the STA declines, such as a case where a received signal strength indicator (RSSI) of the DL frame declines, or in a case where the user instructs the STA to switch a connection destination, in Step S2, the STA transmits a BSS transition query frame to the AP 1.

FIG. 6 is a diagram illustrating a configuration example of a frame format of a BSS transition query frame.

The BSS transition query frame includes Category, WNM Action, Dialog Token, BSS Transition Query Reason, and BSS Transition Candidate List Entries.

The Category and the WNM Action indicate content of categories of the frame.

The Dialog Token indicates a processing number.

The BSS Transition Query Reason indicates a reason for connection switching such as a decline in reception rate.

The BSS Transition Candidate List Entries indicate a list of candidates of connection switching destinations.

In Step S11 of FIG. 5, the AP 1 receives the BSS transition query frame transmitted from the STA.

In Step S12, the AP 1 determines the AP 2 as a switching destination AP on the basis of the BSS transition query frame, and transmits a BSS transition request (BSS Transition Management Request) frame requesting transition to the AP 2, to the STA.

FIG. 7 is a diagram illustrating a configuration example of a frame format of a BSS transition request frame.

The BSS transition request frame includes Category, WNM Action, Dialog Token, Request mode, Disassociation Timer, Validity Interval, BSS Termination Duration, Session Information URL, and BSS Transition Candidate List Entries.

The Category, the WNM Action, the Dialog Token, and the BSS Transition Candidate List Entries are similar to the Category, the WNM Action, and the Dialog Token of the BSS transition query frame.

The Request mode indicates whether or not to issue a switching request.

The Disassociation Timer indicates when a request frame is to be transmitted.

The Validity Interval indicates a validity period during which a connection destination is to be switched.

The BSS Termination Duration indicates whether to immediately transmit a frame or transmit a frame after a wait.

The Session Information URL indicates information for connecting to an external network.

In Step S3 of FIG. 5, the STA receives the BSS transition request frame transmitted from the AP 1.

In Step S4, the STA returns a BSS transition response (BSS Transition Management Request) frame to the AP 1.

FIG. 8 is a diagram illustrating a configuration example of a frame format of a BSS transition response frame.

The BSS transition response frame includes Category, WNM Action, Dialog Token, BTM Status Code, BSS Termination Delay, Target BSSID, and BSS Transition Candidate List Entries.

The Category, the WNM Action, the Dialog Token, and the BSS Transition Candidate List Entries are similar to the Category, the WNM Action, and the Dialog Token of the BSS transition query frame.

The BTM Status Code indicates a state of the BSS transition response frame.

The BSS Termination Delay indicates a delay time of a connection switching end.

The Target BSSID indicates identification information of a switching destination BSS.

In Step S13 of FIG. 5, the AP 1 receives the BSS transition response frame transmitted from the STA.

In Step S5, the STA transmits a reconnection request frame to the AP 2.

If the AP 2 receives the reconnection request frame transmitted from the STA in Step S21, in Step S22, the AP 2 transmits a reconnection response frame to the STA.

In Step S6, the STA receives the reconnection response frame transmitted from the AP 2.

The above-described conventional signal exchange is a method defined in the IEEE802.11k.

In such conventional signal exchange, even though communication quality of connection with the AP 1 declines, the STA has been required to receive a BSS transition request from the AP 1 before switching a connection destination. Thus, there has been concern that switching of a connection destination takes time, or switching of a connection destination fails.

In view of the foregoing, in the present technology, the AP 2 is caused to generate a frame indicating a response of connection switching that is to be transmitted to an STA that switches a connection destination from the AP 1 to the AP 2, on the basis of information regarding connection between the AP 1 and the STA.

Therefore, the STA can receive a response frame generated by the switching destination AP 2, and smoothly switch a connection destination to the AP 2 serving as a new connection destination.

<First Switching Example of Connection Destination of Present Technology>

Figure 9:
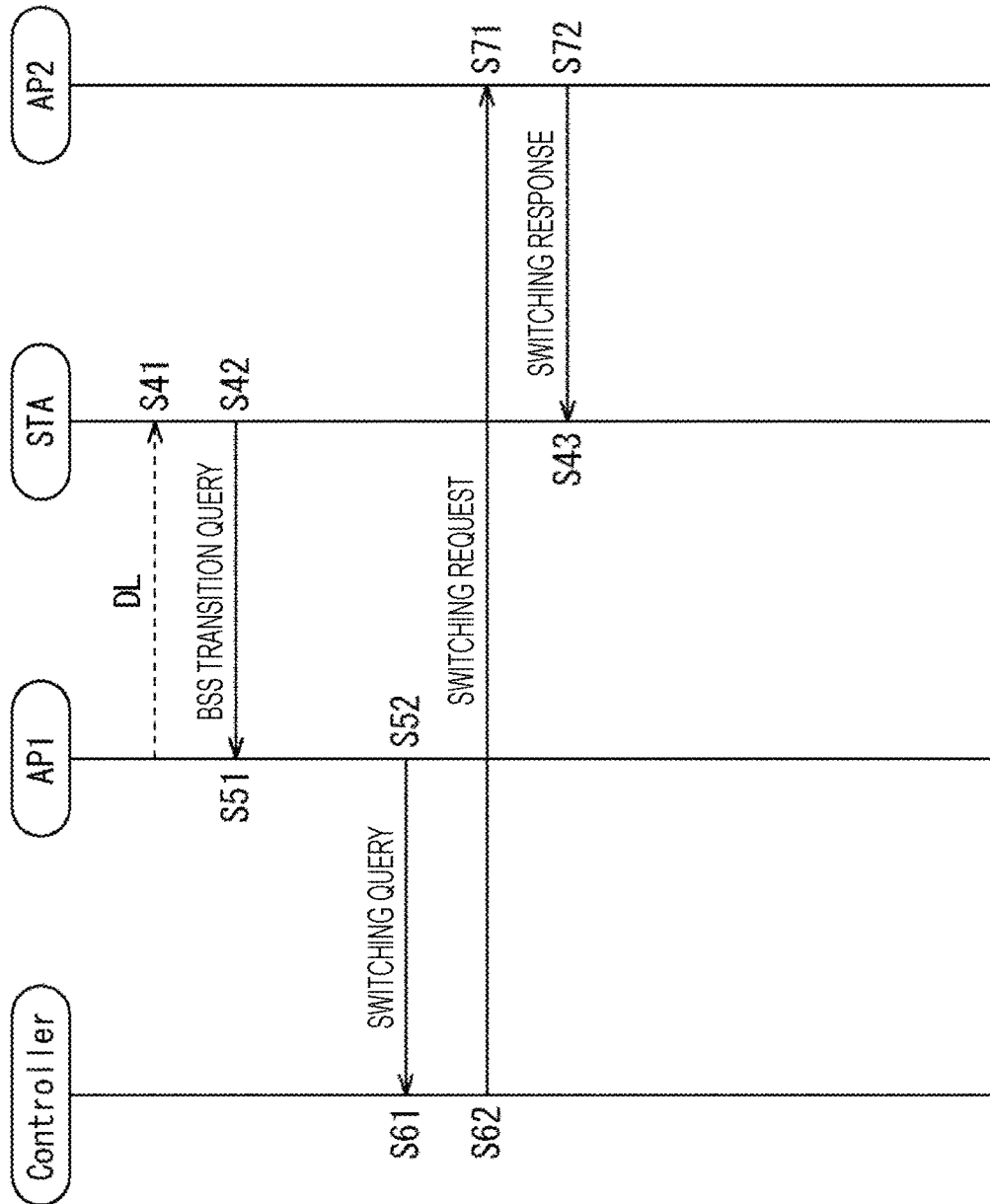
FIG. 9 is a diagram illustrating a sequence describing a series of operations of switching of a connection destination according to a first embodiment of the present technology.

FIG. 9 is a sequence diagram describing a series of operations of switching of a connection destination according to the first embodiment of the present technology.

The AP 1 and the STA are connected and perform communication. In Step S41, the STA receives a DL frame transmitted from the AP 1.

In a case where communication quality between the AP 1 and the STA declines due to a decline in an RSSI of the DL frame or the like, in Step S42, the STA transmits a BSS transition query frame to the AP 1.

In Step S51, the AP 1 receives the BSS transition query frame (FIG. 6) transmitted from the STA.

In Step S52, the AP 1 transmits a switching query frame to the controller. The AP 1 includes information regarding connection that has been used for connection between the AP 1 and the STA, in the switching query frame in addition to information included in the BSS transition query frame, and transmits the switching query frame.

The information regarding connection includes at least one of a common key to be generated by device authentication, a MAC address of the AP 1, a MAC address of the STA, or the like, for example.

FIG. 10 is a diagram illustrating a configuration example of a frame format of a switching query frame.

The configuration of the switching query frame is different from the configuration of the BSS transition query frame in FIG. 6 in that Connection Information is added.

The switching query frame includes Category, WNM Action, Dialog Token, BSS Transition Query Reason, BSS Transition Candidate List Entries, and Connection Information.

The Connection Information indicates the above-described information regarding connection.

In Step S61 of FIG. 9, the controller receives the switching query frame transmitted from the AP 1.

In Step S62, the controller transmits a switching request frame to the AP 2 being a connection destination.

The switching request frame also includes information regarding connection that has been used for connection between the AP 1 and the STA, in addition to the BSS transition request frame illustrated in FIG. 7.

Note that the determination of a connection destination may be performed by the controller or may be performed by the STA.

In a case where the controller performs the determination of a connection destination, the controller causes the AP 2 to describe each BSSID of an AP to which the STA can switch a connection destination, and an RSSI thereof, in the BSS Transition Candidate List Entries of the switching query frame, for example. The controller that has received the switching query frame in which each BSSID of an AP to which the STA can switch a connection destination, and an RSSI thereof are described can determine an AP with a BSSID having the highest RSSI, as a new connection destination from among these.

Alternatively, the controller may collect, from an AP to which the controller connects, information such as BSS load or BSS Average Access Delay being information regarding a BSS including the AP, and determine a connection destination of the STA on the basis of the collected information.

FIG. 11 is a diagram illustrating a configuration example of a frame format of a switching request frame.

The configuration of the switching request frame is different from the configuration of the BSS transition request frame in FIG. 7 in that Connection Information illustrated in FIG. 10 is added.

The switching request frame includes Category, WNM Action, Dialog Token, Request mode, Disassociation Timer, Validity Interval, BSS Termination Duration, Session Information URL, BSS Transition Candidate List Entries, and Connection Information.

In Step S71 of FIG. 9, the AP 2 receives the switching request frame transmitted from the controller.

In Step S72, the AP 2 generates a switching response frame on the basis of information regarding connection that is included in the switching request frame, and transmits the generated switching response frame to the STA.

In Step S43, the STA receives the switching response frame transmitted from the AP 2. Therefore, the STA switches a connection destination AP.

Note that the generation of the switching response frame in Step S72 is controlled by the transmission of the switching request frame from the controller to the AP 2 in Step S62.

For example, the AP 2 encrypts the switching response frame using the same common key as a common key that has been used for connection between the AP 1 and the STA, among pieces of information regarding connection, and transmits the switching response frame in such a manner as to be decodable by the STA. Furthermore, by setting the MAC address of the STA as a destination address, the AP 2 transmits the switching response frame in such a manner that the STA can receive the switching response frame. At least one operation of these operations is performed by the AP 2.

Note that in a case where the AP 2 cannot accept an STA because of a reason such as a case where the number of STAs existing under the network is already larger than a threshold, the AP 2 may describe information indicating that switching is inexecutable, in the switching response frame, and transmit the switching response frame to the STA.

Furthermore, after the AP 1 receives the BSS transition query frame from the STA, the AP 1 avoids transmission to the STA. The AP 2 transmits the switching response frame in which information indicating that switching is inexecutable is described, to the AP 1 directly or via the controller.

At this time, the AP 1 that has received the switching response frame transmits a frame to the STA. Therefore, the STA can recognize that connection switching has failed, by receiving the frame from the switching source AP 1.

Note that in the example in FIG. 9, a case where the AP 1 or the AP 2 also serves as a controller is also assumed. In a case where the AP 1 also serves as a controller, the AP 1 receives a BSS transition query frame, and transmits a switching request frame to the AP 2 without transmitting a switching query frame.

Furthermore, in a case where the AP 2 also serves as a controller, the AP 2 receives a switching query frame, and transmits a switching response frame to the STA in accordance with information included in the switching request frame generated by itself.

<Operation Example of Each Device>

Figure 12:
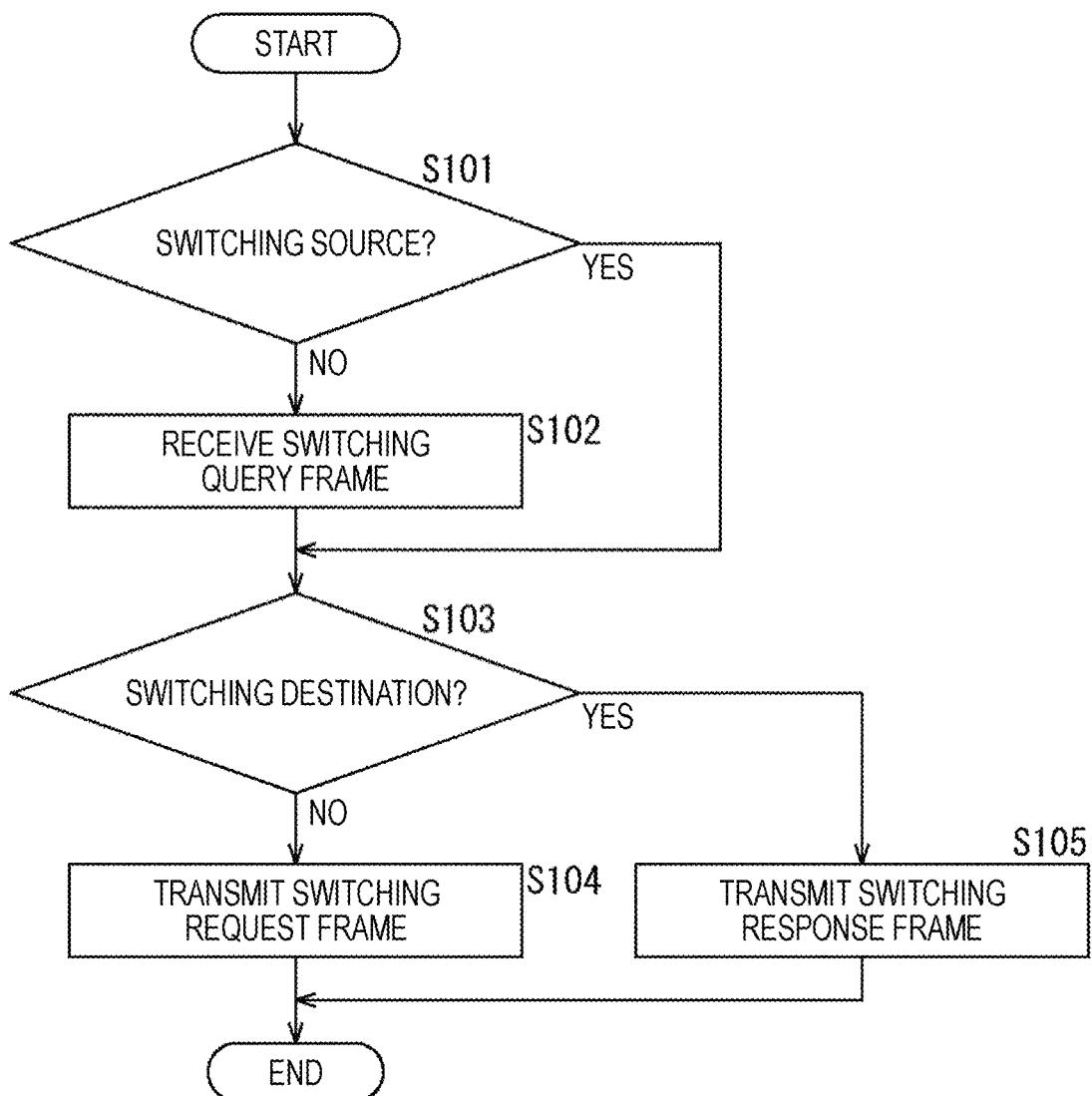
FIG. 12 is a flowchart describing processing of a controller.

FIG. 12 is a flowchart describing processing of a controller.

In some cases, a controller is formed as a single body as a communication control device, but in other cases, a controller is formed by a communication device functioning as an AP, and the AP also serves as the controller as described above.

In Step S101, the control unit 31 (FIG. 2 or 3) of the controller determines whether or not the controller is a switching source AP (AP 1).

In a case where it is determined in Step S101 that the controller is formed as a single body, and is not a switching source AP (AP 1), the processing proceeds to Step S102.

In Step S102, the wireless receiving unit 41 receives a switching query frame transmitted from the AP 1. The data processing unit 32 generates a switching request frame on the basis of an instruction issued by the control unit 31, information collected by the network control unit 61, data extracted from the switching query frame, and the like.

In a case where it is determined in Step S101 that the controller is a switching source AP (AP 1), the processing proceeds to Step S103 by skipping Step S102. In this case, the data processing unit 32 generates a switching request frame in accordance with an instruction issued by the control unit 31.

In Step S103, the control unit 31 determines whether or not the controller is a switching destination AP (AP 2).

In a case where it is determined in Step S103 that the controller is formed as a single body, and is not a switching destination AP (AP 2), the processing proceeds to Step S104.

In Step S104, the wireless transmission unit 42 transmits the switching request frame generated by the data processing unit 32, to the AP 2.

In a case where it is determined in Step S103 that the controller is a switching destination AP (AP 2), the processing proceeds to Step S105. In this case, the data processing unit 32 generates a switching response frame on the basis of an instruction issued by the control unit 31, data extracted from the switching request frame generated by the data processing unit 32, and the like.

In Step S105, the wireless transmission unit 42 transmits the switching response frame generated by the data processing unit 32, to the STA.

In a case where the switching request frame is transmitted to the AP 2 in Step S104, or in a case where the switching response frame is transmitted to the STA in Step S105, the processing of the controller ends.

Figure 13:
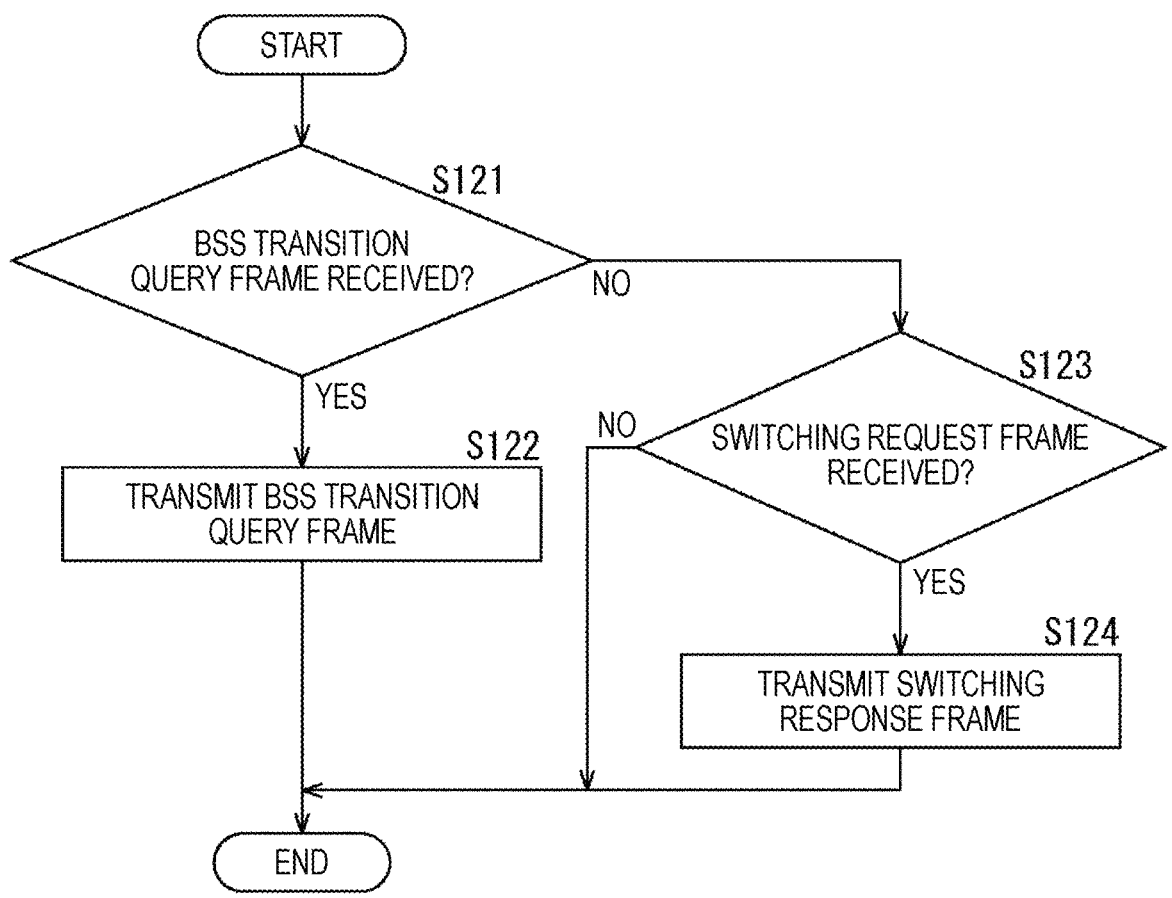
FIG. 13 is a flowchart describing processing of an AP.

FIG. 13 is a flowchart describing processing of an AP.

In Step S121, the wireless receiving unit 41 (FIG. 2) of an AP determines whether or not a BSS transition query frame transmitted from an STA has been received.

In a case where it is determined in Step S121 that the BSS transition query frame has been received, the processing proceeds to Step S122. In this case, the AP is the connection switching source AP 1. The data processing unit 32 generates a switching query frame on the basis of an instruction issued by the control unit 31, data extracted from the BSS transition query frame received by the wireless receiving unit 41, and the like.

In Step S122, the wireless transmission unit 42 transmits the switching query frame generated by the data processing unit 32, to the controller.

In a case where it is determined in Step S121 that the BSS transition query has not been received, the processing proceeds to Step S123. In this case, the AP is a switching destination AP 2.

In Step S123, the wireless receiving unit 41 determines whether or not a switching request frame transmitted from the controller has been received.

In a case where it is determined in Step S123 that the switching request frame has been received, the processing proceeds to Step S124. The data processing unit 32 generates a switching response frame on the basis of an instruction issued by the control unit 31, data extracted from the switching request frame received by the wireless receiving unit 41, and the like.

In Step S124, the wireless transmission unit 42 transmits the switching response frame generated by the data processing unit 32, to the STA.

In a case where the switching query frame is transmitted to the controller in Step S122, or in a case where the switching response frame is transmitted to the STA in Step S124, the processing of the AP ends. Also in a case where it is determined in Step S123 that the switching request frame has not been received, the processing of the AP similarly ends.

Figure 14:
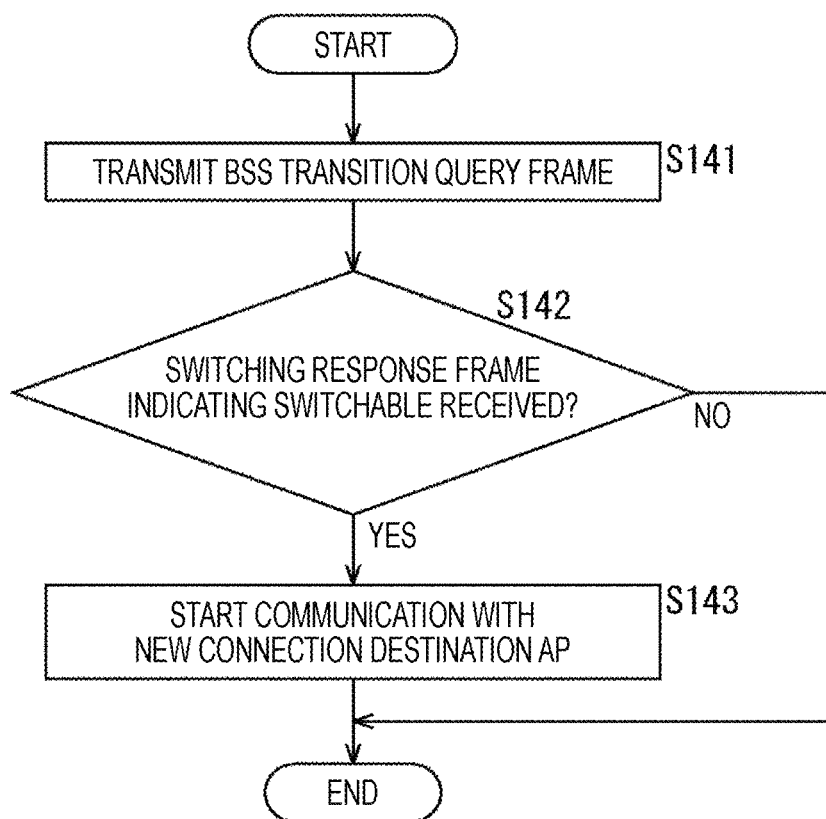
FIG. 14 is a flowchart describing processing of an STA.

FIG. 14 is a flowchart describing processing of an STA.

The data processing unit 32 (FIG. 4) of an STA generates a BSS transition query frame in accordance with an instruction issued by the control unit 31.

In Step S141, the wireless transmission unit 42 transmits the BSS transition query frame generated by the data processing unit 32, to the AP 1.

In Step S142, the wireless receiving unit 41 determines whether or not a switching response frame indicating switchable has been received.

In a case where it is determined in Step S142 that a switching response frame indicating switchable has been received, the processing proceeds to Step S143.

At this time, as described above, the switching response frame is encrypted using the same common key as a common key that has been used for connection between the AP 1 and the STA, among pieces of information regarding connection between the AP 1 and the STA, and the switching response frame is transmitted in such a manner as to be decodable by the STA. Furthermore, by setting the MAC address of the STA as a destination address, the switching response frame is transmitted in such a manner that the STA can receive the switching response frame.

Thus, in this case, because the STA is set as a destination, and the frame can be decoded on the basis of the information regarding connection between the AP 1 and the STA, the data processing unit 32 extracts data described in the switching response frame, and outputs the extracted data to the control unit 31.

In Step S143, the control unit 31 controls the data processing unit 32 and the wireless communication unit 33 to start communication with the AP 2 serving as a new connection destination, on the basis of the data extracted from the switching response frame.

In a case where communication with the connection destination AP 2 has been started in Step S143, or in a case where it is determined in Step S142 that a switching response frame indicating switchable has not been received, the processing of the STA ends.

2. Second Embodiment (Example of Start by AP

Next, an example in which switching of a connection destination is started by an AP will be described as the second embodiment.

<Second Switching Example of Connection Destination of Present Technology>

Figure 15:
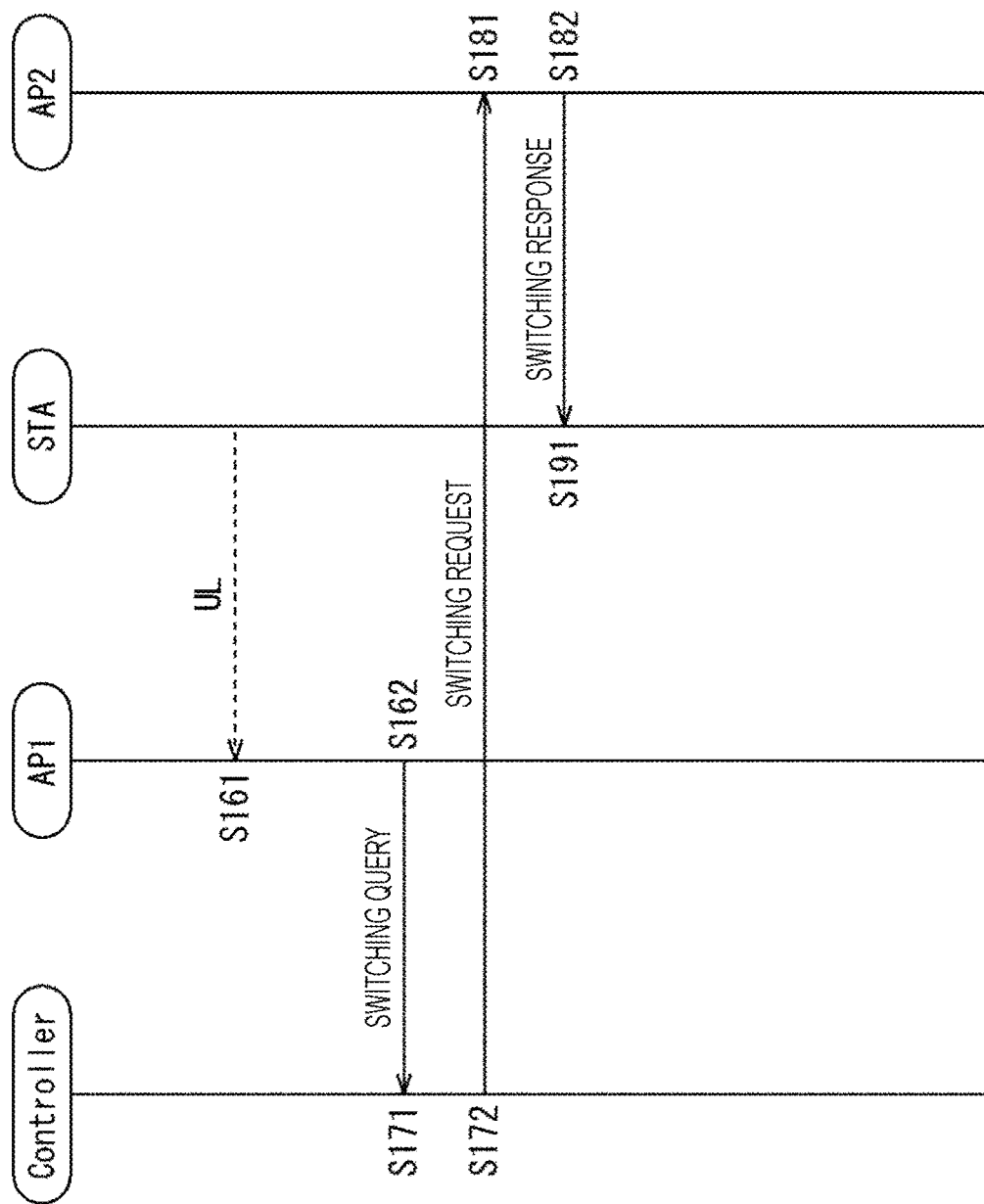
FIG. 15 is a sequence diagram describing a series of operations of switching of a connection destination according to a second embodiment of the present technology.

FIG. 15 is a sequence diagram describing a series of operations of switching of a connection destination according to the second embodiment of the present technology.

The AP 1 and the STA are connected and perform communication. In Step S161, the AP 1 receives an uplink (UL) frame transmitted from the STA.

In a case where communication quality between the AP 1 and the STA declines due to a decline in an RSSI of the UL frame or the like, in Step S162, the AP 1 transmits a switching query frame to the controller. The AP 1 includes information regarding connection that has been used for connection between the AP 1 and the STA, in the switching query frame, and transmits the switching query frame.

In Step S171, the controller receives the switching query frame transmitted from the AP 1.

In Step S172, the controller transmits a switching request frame to the AP 2 being a new connection destination.

The switching request frame also includes information regarding connection that has been used for connection between the AP 1 and the STA, in addition to the above-described BSS transition request frame.

In Step S181, the AP 2 receives the switching request frame transmitted from the controller.

In Step S182, the AP 2 generates a switching response frame on the basis of the information regarding connection, and transmits the generated switching response frame to the STA.

In Step S191, the STA receives the switching response frame transmitted from the AP 2. Therefore, the STA switches a connection destination AP.

Note that the generation of the switching response frame in Step S182 is controlled by the transmission of the switching request frame from the controller to the AP 2 in Step S172.

Furthermore, also in the example in FIG. 15, similarly to the example in FIG. 9, a case where the AP 1 or the AP 2 also serves as a controller is assumed.

3. Third Embodiment (Example of Start by Controller

Next, an example in which switching of a connection destination is started by a controller will be described as the third embodiment.

<Third Switching Example of Connection Destination of Present Technology>

Figure 16:
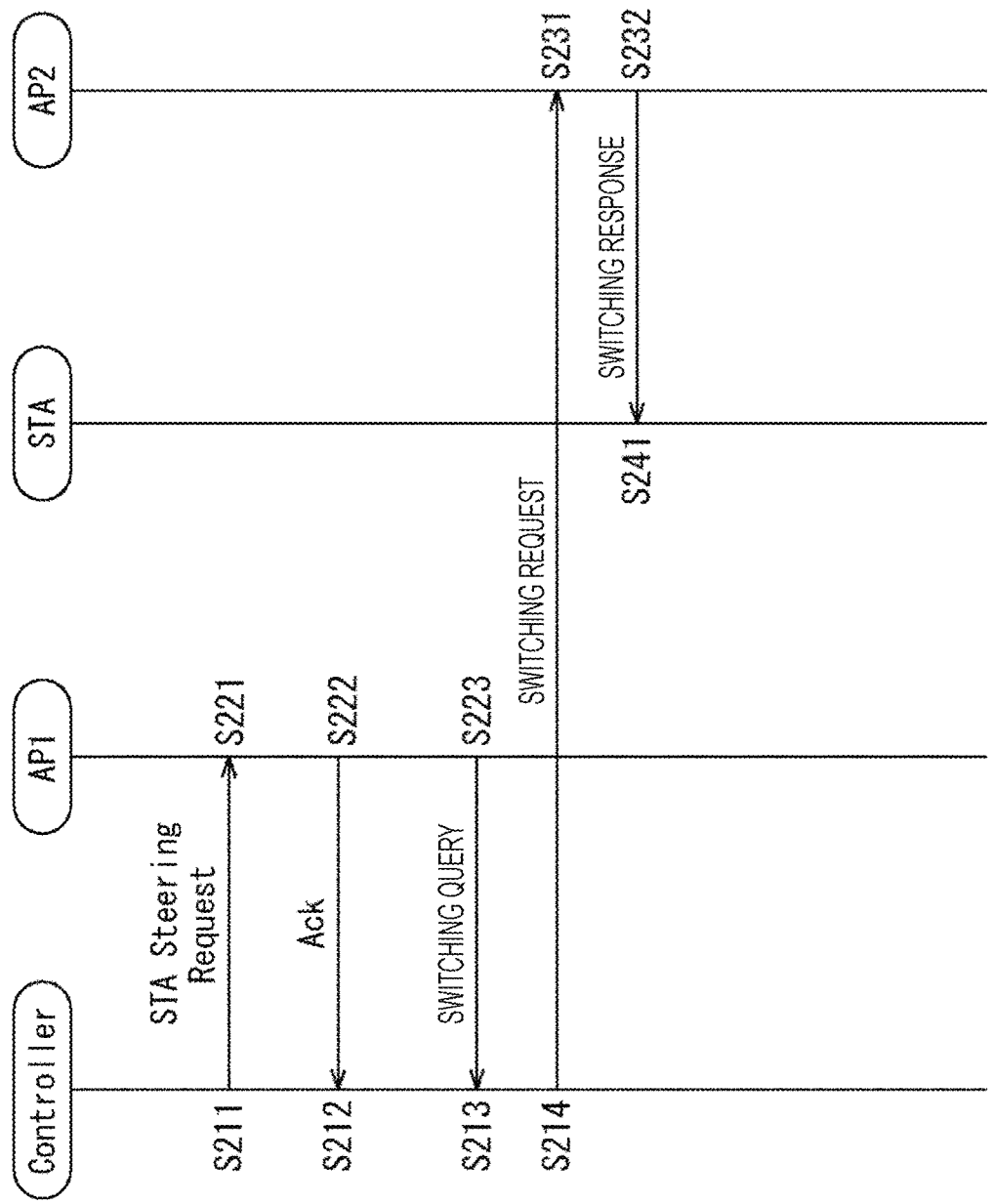
FIG. 16 is a sequence diagram describing a series of operations of switching of a connection destination according to a third embodiment of the present technology.

FIG. 16 is a sequence diagram describing a series of operations of switching of a connection destination according to the third embodiment of the present technology.

The AP 1 and the STA are connected and perform communication. In Step S211, the controller transmits an STA Steering Request frame indicating a request for controlling the STA, to the AP 1.

In Step S221, the AP 1 receives the STA Steering Request frame transmitted from the controller.

In Step S222, the AP 1 transmits ACK to the received STA Steering Request frame, to the controller.

In Step S223, the AP 1 transmits a switching query frame to the controller. The AP 1 includes information regarding connection that has been used for connection between the AP 1 and the STA, in the switching query frame, and transmits the switching query frame.

In Step S212, the controller receives the ACK transmitted from the AP 1.

In Step S213, the controller receives the switching query frame transmitted from the AP 1.

In Step S214, the controller transmits a switching request frame to the AP 2 being a new connection destination. The switching request frame also includes information regarding connection that has been used for connection between the AP 1 and the STA, in addition to the above-described BSS transition request frame.

In Step S231, the AP 2 receives the switching request frame transmitted from the controller.

In Step S232, the AP 2 generates a switching response frame on the basis of the information regarding connection, and transmits the generated switching response frame to the STA.

In Step S241, the STA receives the switching response frame transmitted from the AP 2. Therefore, the STA switches a connection destination AP.

Note that the generation of the switching response frame in Step S232 is controlled by the transmission of the switching request frame from the controller to the AP 2 in Step S214.

Furthermore, also in the example in FIG. 16, similarly to the example in FIG. 9, a case where the AP 1 or the AP 2 also serves as a controller is assumed.

As described above, according to the present technology, because an STA can switch a connection destination to a switching destination AP without receiving a frame from a switching source AP, it is possible to reduce the possibility of a failure in switching of a connection destination in a case where communication quality with the switching source AP is bad.

Furthermore, because the switching destination AP transmits a frame to the STA using information regarding connection between the switching source AP and the STA, it is possible to reduce a frame exchange procedure for establishing connection between the STA and the switching destination AP.

4. Fourth Embodiment (Computer

<Configuration Example of Computer>

The above-described series of processes can be executed by hardware, and can be executed by software. In a case where the series of processes are executed by software, programs constituting the software are installed from a program recording medium onto a computer incorporated into dedicated hardware, or a general-purpose personal computer, or the like.

Figure 17:
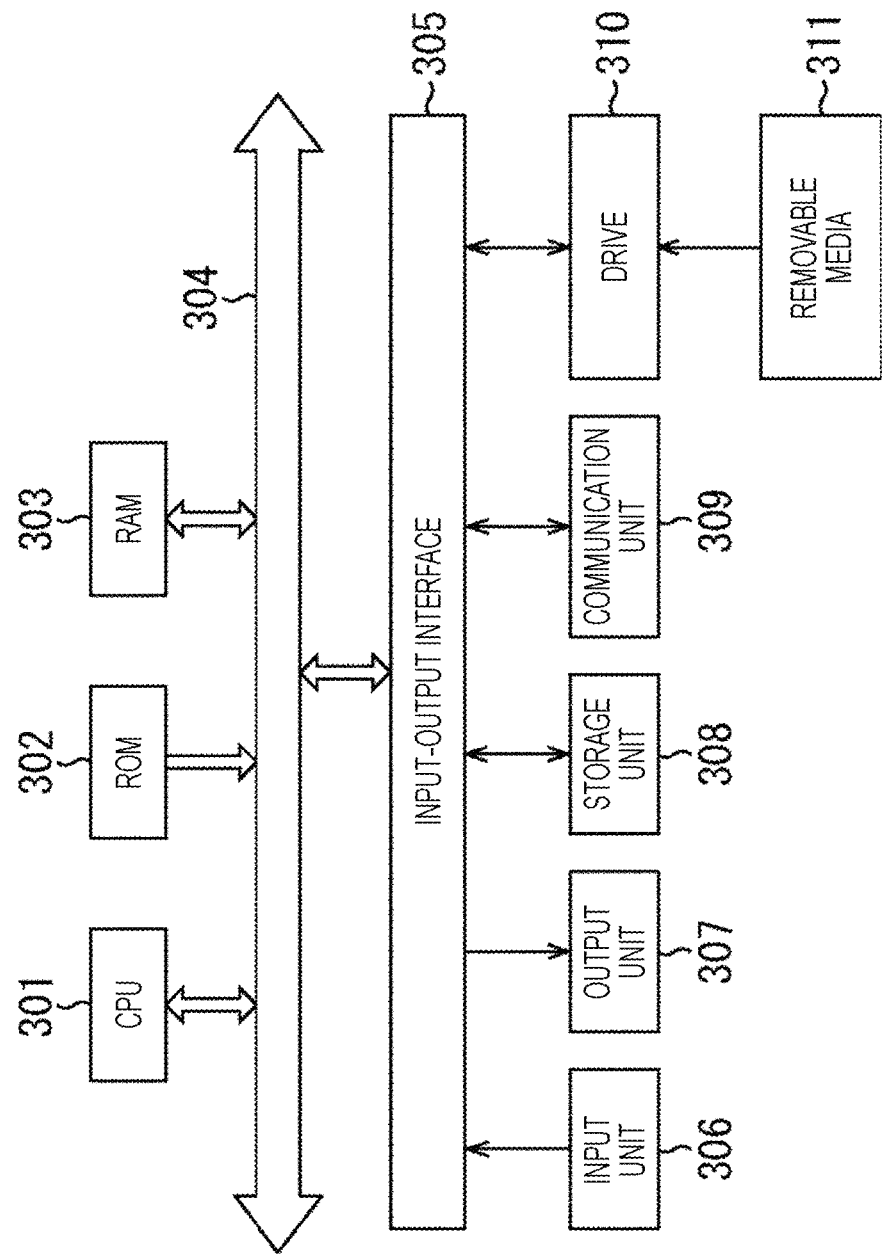
FIG. 17 is a block diagram illustrating a configuration example of a computer.

FIG. 17 is a block diagram illustrating a configuration example of hardware of a computer that executes the above-described series of processes according to programs.

A central processing unit (CPU) 301, a read only memory (ROM) 302, and a random access memory (RAM) 303 are connected to one another via a bus 304.

An input-output interface 305 is further connected to the bus 304. An input unit 306 including a keyboard, a mouse, and the like, and an output unit 307 including a display, a speaker, and the like are connected to the input-output interface 305. Furthermore, a storage unit 308 including a hard disc, a nonvolatile memory, and the like, a communication unit 309 including a network interface and the like, and a drive 310 that drives removable media 311 are connected to the input-output interface 305.

In the computer having the above-described configuration, the above-described series of processes are performed by the CPU 301 loading programs stored in, for example, the storage unit 308, into the RAM 303 via the input-output interface 305 and the bus 304, and executing the programs.

The programs to be executed by the CPU 301 are provided with being recorded on the removable media 311, for example, or via a wired or wireless transmission medium such as a local area network, the Internet, and digital satellite broadcasting, and installed on the storage unit 308.

Note that programs to be executed by the computer may be programs according to which processes are chronologically performed in the order described in this specification. Alternatively, the programs may be programs according to which processes are performed in parallel, or at necessary timings such as a timing when call-out is performed.

Note that, in this specification, a system means a set of a plurality of constituent elements (apparatuses, modules (parts), and the like), and it does not matter whether or not all the constituent elements are provided in the same casing. Thus, a plurality of apparatuses stored in separate casings and connected via a network, and a single apparatus in which a plurality of modules is stored in a single casing are both regarded as systems.

Furthermore, effects described in this specification are mere exemplifications and are not limited, and other effects may be caused.

An embodiment of the present technology is not limited to the above-described embodiment, and various changes can be made without departing from the scope of the present technology.

For example, the present technology can employ a configuration of cloud computing in which a single function is shared by a plurality of apparatuses and processed in cooperation with each other, via a network.

Furthermore, instead of being executed by a single apparatus, each step described in the above-described flowcharts can be executed by a plurality of apparatuses in a shared manner.

Moreover, in a case where a plurality of processes is included in a single step, the plurality of processes included in the single step can be executed by a plurality of apparatuses in a shared manner, instead of being executed by a single apparatus.

<Combination Example of Configurations>

The present technology can also employ the following configurations.

(1) A communication control device including:
  a control unit configured to cause a second communication device to generate a switching response frame indicating a response of connection switching that is to be transmitted to a communication terminal configured to switch a connection destination from a first communication device to the second communication device, on the basis of information regarding connection between the first communication device and the communication terminal.

(2) The communication control device according to (1) described above, in which the information regarding connection includes at least one of a common key generated by device authentication, a MAC address of the first communication device, or a MAC address of the communication terminal.

(3) The communication control device according to (1) or (2) described above, further including
a transmission unit configured to transmit the switching response frame to the communication terminal.

(4) The communication control device according to (1) or (2) described above, further including
a transmission unit configured to transmit a switching request frame including the information regarding connection and indicating a request of connection switching, to the second communication device,
in which the control unit causes the second communication device to generate the switching response frame on the basis of the switching request frame.

(5) The communication control device according to (4) described above, further including
a receiving unit configured to receive a transition query frame indicating a query of connection transition that is transmitted from the communication terminal,
in which the control unit generates a switching query frame indicating a query of connection switching, on the basis of the transition query frame.

(6) The communication control device according to (4) described above, further including
a receiving unit configured to receive a switching query frame including the information regarding connection and indicating a query of connection transition that is transmitted from the first communication device,
in which the control unit generates the switching request frame on the basis of the switching query frame.

(7) The communication control device according to (6) described above,
in which the control unit determines the second communication device on the basis of the switching query frame.

(8) A communication control method including:
by a communication control device,
causing a second communication device to generate a switching response frame indicating a response of connection switching that is to be transmitted to a communication terminal configured to switch a connection destination from a first communication device to the second communication device, on the basis of information regarding connection between the first communication device and the communication terminal.

(9) A communication terminal including:
a receiving unit configured to receive a transmitted switching response frame indicating a response of connection switching that is generated by a second communication device on the basis of information regarding connection with a first communication device; and
a control unit configured to switch a connection destination from the first communication device to the second communication device in a case where the switching response frame is decoded.

(10) The communication terminal according to (9) described above,
in which the communication unit further includes a transmission unit configured to transmit a transition query frame indicating a query of connection transition, to the first communication device,
the receiving unit receives the transmitted switching response frame generated by the second communication device on the basis of a switching request frame indicating a request of connection switching and including the information regarding connection added to the query of connection transition.

(11) The communication terminal according to (9) or (10) described above,
in which the information regarding connection includes at least one of a common key generated by device authentication, a MAC address of the first communication device, or a MAC address of itself.

(12) A communication method including:
by a communication terminal,
receiving a transmitted switching response frame indicating a response of connection switching that is generated by a second communication device on the basis of information regarding connection with a first communication device, and
switching a connection destination from the first communication device to the second communication device in a case where the switching response frame is decoded.

REFERENCE SIGNS LIST

21 Communication device
31 Control unit
32 Data processing unit
33 Wireless communication unit
34 Wired communication unit
41 Wireless receiving unit
42 Wireless transmission unit
43 Wired receiving unit
44 Wired transmission unit
51 Communication control device
61 Network control unit
81 Communication terminal

The invention claimed is:
1. A communication control device comprising:
control circuitry configured to cause a second communication device to generate a switching response frame indicating a response of connection switching that is to be transmitted to a communication terminal configured to switch a connection destination from a first communication device to the second communication device, on a basis of information regarding connection between the first communication device and the communication terminal;
a transmitter configured to transmit a switching request frame including the information regarding connection and indicating a request of connection switching, to the second communication device,
wherein the control circuitry causes the second communication device to generate the switching response frame on a basis of the switching request frame; and
a receiver configured to receive a transition query frame indicating a query of connection transition that is transmitted from the communication terminal,
wherein the control circuitry generates a switching query frame indicating a query of connection switching, on a basis of the transition query frame.

2. The communication control device according to claim 1,
wherein the information regarding connection includes at least one of a common key generated by device authentication, a MAC address of the first communication device, or a MAC address of the communication terminal.

3. The communication control device according to claim 1, further comprising
a transmitter configured to transmit the switching response frame to the communication terminal.

4. The communication control device according to claim 1, further comprising
a receiver configured to receive a switching query frame including the information regarding connection and indicating a query of connection transition that is transmitted from the first communication device,
wherein the control circuitry generates the switching request frame on a basis of the switching query frame.

5. The communication control device according to claim 4,
wherein the control circuitry determines the second communication device on a basis of the switching query frame.

6. A communication control method performed by a communication control device and comprising:
causing a second communication device to generate a switching response frame indicating a response of connection switching that is to be transmitted to a communication terminal configured to switch a connection destination from a first communication device to the second communication device, on a basis of information regarding connection between the first communication device and the communication terminal;
transmitting a switching request frame including the information regarding connection and indicating a request of connection switching, to the second communication device,
wherein the switching response frame is generated on a basis of the switching request frame; and
receiving a transition query frame indicating a query of connection transition that is transmitted from the communication terminal,
wherein a switching query frame indicating a query of connection switching is generated on a basis of the transition query frame.

7. A non-transitory computer product containing instructions for causing a communication control device to perform a method, the method comprising:
causing a second communication device to generate a switching response frame indicating a response of connection switching that is to be transmitted to a communication terminal configured to switch a connection destination from a first communication device to the second communication device, on a basis of information regarding connection between the first communication device and the communication terminal;
transmitting a switching request frame including the information regarding connection and indicating a request of connection switching, to the second communication device,
wherein the switching response frame is generated on a basis of the switching request frame; and
receiving a transition query frame indicating a query of connection transition that is transmitted from the communication terminal,
wherein a switching query frame indicating a query of connection switching is generated on a basis of the transition query frame.

* * * * *